United States Patent [19]

Kling et al.

[11] Patent Number: 5,014,227

[45] Date of Patent: May 7, 1991

[54] CASTER AND STEERING AXIS INCLINATION MEASUREMENT TECHNIQUE

[75] Inventors: Michael J. Kling, Mequon; John M. Surwillo, Milwaukee; Peter A. Puetz, Waukesha; Robert T. Braun, Milwaukee, all of Wis.

[73] Assignee: Bear Automotive Service Equipment Company, Milwaukee, Wis.

[21] Appl. No.: 380,635

[22] Filed: Jul. 17, 1989

[51] Int. Cl.$^5$ ............................................. G06F 15/20
[52] U.S. Cl. .................. 364/559; 33/204.18; 364/424.03
[58] Field of Search ............. 364/559, 550, 424.05, 364/424.03; 33/203.12, 203.18; 356/155

[56] References Cited

U.S. PATENT DOCUMENTS

| | | | |
|---|---|---|---|
| 4,381,548 | 4/1983 | Grossman et al. | 364/359 |
| B1 4,381,548 | 8/1986 | Grossman et al. | 364/559 |
| 4,394,798 | 7/1983 | Beissbarth | 364/550 |
| 4,430,802 | 2/1984 | Cole | 33/203.12 |
| 4,500,201 | 2/1985 | Lill | 33/203.18 |
| 4,546,548 | 10/1985 | Bullock | 33/203.18 |
| 4,594,789 | 6/1986 | Marino et al. | 356/155 |
| 4,761,749 | 8/1988 | Titsworth et al. | 364/559 |
| 4,898,464 | 2/1990 | Thorne et al. | 33/203.18 |

OTHER PUBLICATIONS

"Steering Geometry and Caster Measurement" by Daniel B. January, published in 1985.

Primary Examiner—Parshotam S. Lall
Assistant Examiner—Ellis B. Ramirez
Attorney, Agent, or Firm—Kinney & Lange

[57] ABSTRACT

A wheel alignment system measures caster and steering axis inclination (SAI) by positioning the wheels at a right turn position and a left turn position. Toe, camber and inclination angle measurements are made for both wheels at both the left turn position and the right turn position. Based upon these measurements, caster and SAI are calculated either directly or through an iterative technique.

23 Claims, 3 Drawing Sheets

CASTER AND STEERING AXIS INCLINATION MEASUREMENT TECHNIQUE

BACKGROUND OF THE INVENTION

1. Field of the Invention.

The present invention relates to a wheel alignment technique and in particular an improved technique for measuring caster and steering axis inclination.

2. Description of the Prior Art.

Proper alignment of the wheels of an automotive vehicle is important for proper handling of the vehicle and proper tire wear. In addition, proper alignment of the wheels will decrease fuel consumption as well as increase vehicle safety. The wheel alignment parameters which are measured and adjusted in order to achieve proper wheel alignment are camber, caster, steering axis inclination (SAI) and toe.

Camber angle is the inclination of the wheel plane with respect to vertical. It is considered positive when the wheel leans outward at the top, and is considered negative when it leans inward. Any wheel of an automobile can have camber.

Caster angle is the angle in side elevation between the steering axis of a steerable wheel (typically one of the front wheels) with respect to vertical. It is considered positive when the steering axis is inclined rearward (in the upward direction) and negative when the steering axis is inclined forward.

Steering axis inclination (SAI) or king pin inclination is the angle in the front elevation between the steering axis and vertical.

The static toe angle of a wheel, at a specified wheel load or relative position of the wheel center with respect to the sprung mass, is the angle between a longitudinal axis of the vehicle and the line of intersection of the wheel plane and the road surface. The wheel is "toed-in" if the forward portion of the wheel is turned toward a central longitudinal axis of the vehicle, and "toed-out" if turned away.

Camber, caster and SAI are typically measured using one or more inclinometer which are attached to the wheel. With camber, the inclinometer measures the angle that the plane of the wheel makes with the vertical. To measure caster, the wheel is turned through an arc, and the difference in the camber readings is used to derive the caster value. SAI is measured in a manner similar to caster, except that the inclinometer used for the SAI reading measures the change in inclination angle of a line in the plane of the wheel as the wheel is turned through an arc. The SAI measuring inclinometer is aligned at 90° to the inclinometer used for reading camber and caster.

On an automotive vehicle, the two front wheels do not steer at the same rate in a turn. This is a requirement for proper handling of the vehicle during cornering. During cornering in an automobile, the wheel traveling along the inner arc of the turn must be at a sharper angle than the wheel traveling along the outer arc of the turn. Thus, when one wheel is turned to a precise toe-in angle, the opposing front wheel is not also turned to an equal toe-out angle. Previously, this has hampered measurements of caster and SAI angles because accurate measurements of camber and inclination angle for each front wheel had to be taken with the wheels at four precisely positioned toe angles. The steps in this process were positioning the left wheel precisely at a left toe-in angle and a left toe-out angle at which camber and inclination angles were measured and repeating the procedure by positioning the right wheel precisely at a right toe-out angle and a right toe-in angle at which measurements were taken of camber and inclination angles. Thus, camber and inclination angle measurements were taken at four precise toe angle values.

For example, the front wheels had to be steered left until the left wheel was positioned at the left toe-out angle equal to X. A first set of inclinometer readings from the left wheel would then be taken for camber (LC1) and inclination angle (LS1).

Next, the front wheels were turned further left until the right wheel was positioned at a right toe-in angle equal to X. Values were then recorded from inclinometer on the right wheel for camber (RC2) and inclination angle (RS2).

The front wheels were then turned to the right until the right wheel was positioned at the right toe-out angle equal to X. Values were then recorded from the inclinometer on the right wheel for camber (RC1) and inclination angle (RS1).

Finally, the wheels were turned further right until the left wheel was positioned at the left toe-in angle equal to X. In this position, additional readings were taken from the inclinometer on the left wheel for camber (LC2) and inclination angle (LS2).

Using common equations, caster and SAI can be calculated. For example:

$$CASTER = arctan((C1 - C2)/(2 \sin X)) \quad \text{Equation 1}$$

$$SAI = arctan((S1 - S2)/(2 \sin X)) \quad \text{Equation 2}$$

Using the above method of measuring caster and SAI, there are four steps each requiring positioning the wheels very precisely at each turn angle of the left (X) in and out toe angle, and the right (X) in and out toe angle. Furthermore, because the wheels must be precisely positioned four times, there is an increased probability that the measurements are taken at an erroneous wheel position.

The increased probability of errors entering the calculations in the above described method of measuring caster and SAI along with the problem that even a small error in an inclinometer reading will result in a significant error in caster and SAI calculations make the above method difficult, time consuming and expensive.

Thus, a new caster and SAI measurement technique in a wheel alignment system is desired that reduces the precision required in positioning the wheels and the number of times they must be positioned.

SUMMARY OF THE INVENTION

The wheel alignment measurement system of the present invention measures the caster and SAI of the two front (steerable) wheels of an automotive vehicle by taking measurements at just two steering angles. In addition, the necessary precision required in the positioning of the wheels is greatly reduced. Using this method, fewer steps are required by the operator. This results in time and cost savings and increased accuracy in the caster and SAI calculations.

Using the present invention only two steps are required in the positioning of the wheels. First, the wheels are turned to the left to a left turn position so that the left wheel is positioned at a left toe-out angle of approximately X. The left wheel does not need to be positioned precisely since the described method tolerates a wide range of positions. In this position, measurements are taken of the toe angles of both wheels, the camber angles of both wheels, and the inclination angles of both wheels.

The wheels are turned to the right to a right turn position so that the right wheel is at a right toe-out angle equal to approximately Y. Y may be the same angle as X, although this is not a requirement of the present invention. The right wheel does not need to be positioned precisely since the described method tolerates a wide range of positions. With the wheels in this position, additional measurements are taken of the toe angle of both wheels, the camber angle of both wheels and the inclination angle of both wheels.

Caster and SAI are then calculated using either an iterative technique or from a set of equations having a closed form solution, both suitable for implementation on a computer.

DETAILED DESCRIPTION OF THE PREFERRED EMBODIMENTS

Figure 1A:
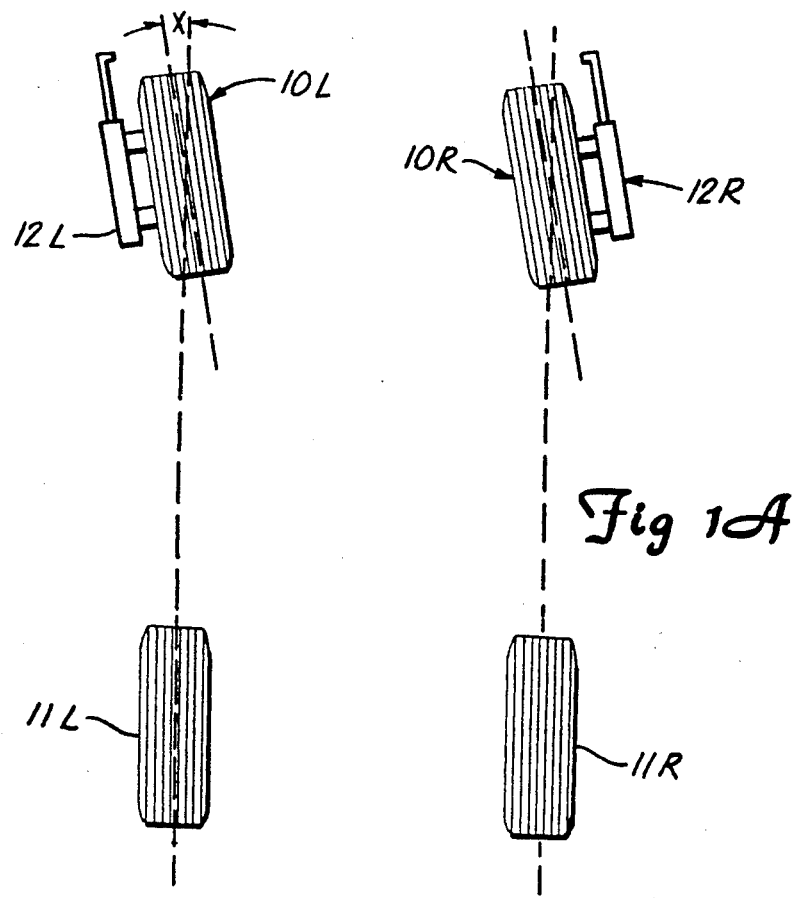
FIGS. 1A and 1B show the front steerable wheels of an automotive vehicle turned to a left toe-out and a right toe-out angle, respectively.
Figure 1B:
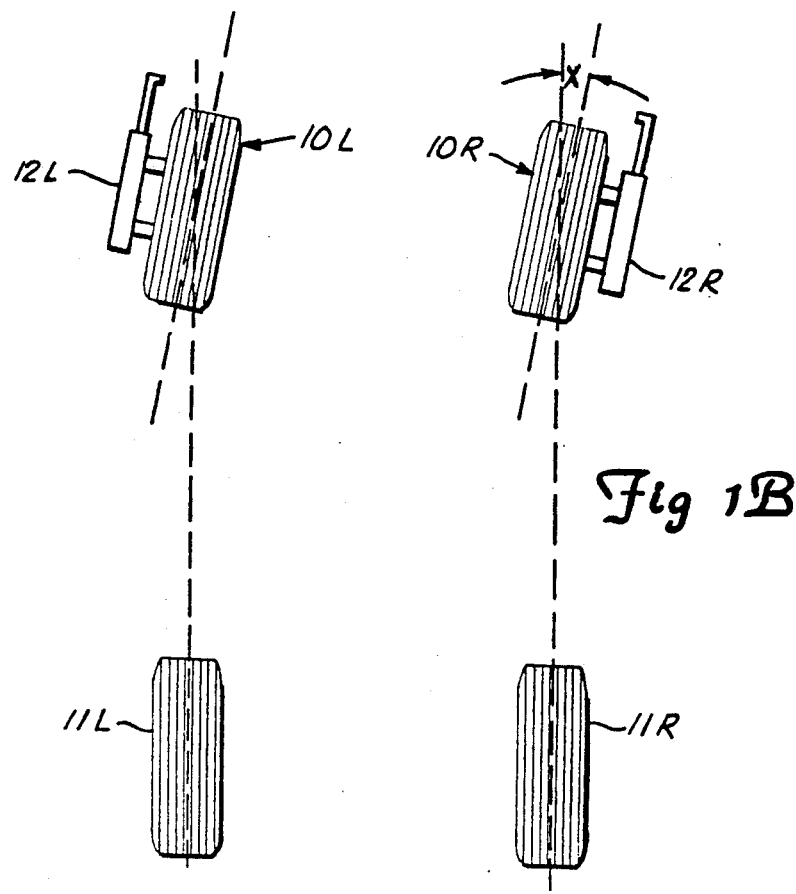

The new caster and SAI measurement technique of the present invention requires taking camber and inclination angle data at just two wheel positions, a left turn position (illustrated in FIG. 1A) and a right turn position (illustrated in FIG. 1B). Although these positions are shown as having equal angles, this is not a requirement of the present invention. In addition, the precision required in the positioning of front wheels 10L and 10R at the left and right toe positions to produce accurate caster and SAI measurements is significantly reduced. Rear wheels 11L and 11R are also shown in FIGS. 1A and 1B. Caster and SAI are measured relative to the thrust line of the vehicle which is determined by rear wheels 11L and 11R.

Figure 2:
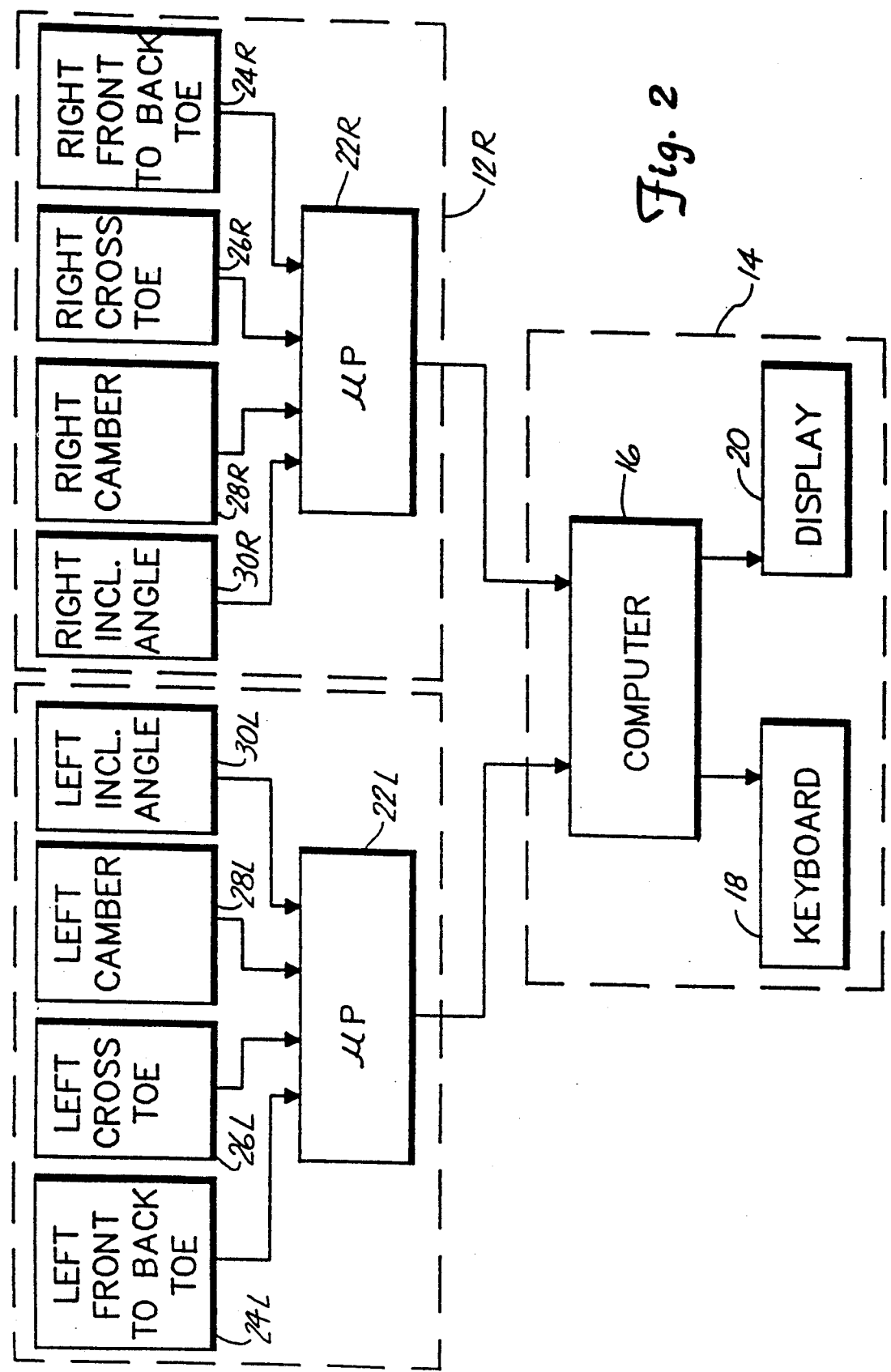
FIG. 2 is a block diagram of a wheel alignment system.

Using the present invention, toe, camber and inclination angle measurements are made by left and right head units 12L and 12R for wheels 10L and 10R, respectively. As shown in FIG. 2, head units 12L and 12R are connected to main console 14, which includes computer 16, keyboard 18 and display 20. Left head unit 12L includes microprocessor 22L, left front-to-back toe sensor 24L, left cross toe sensor 26L, left camber sensor 28L, and left inclination angle sensor 30L. Similarly, right head unit 12R includes microprocessor 22R, right front-to-back toe sensor 24R, right cross toe sensor 26R, right camber sensor 28R, and right inclination angle sensor 30R. Rear wheels 11L and 11R include similar head units (not shown) for measuring the thrust line of the vehicle.

Computer 16 receives commands and input data from keyboard 18 and provides information and instructions to automotive service technicians through display 20. Computer 16 also receives measurement data from microprocessors 22L and 22R of head units 12L and 12R, respectively. Microprocessors 22L and 22R receive sensor signals from their associated sensors and process those signals as needed before sending the signals to computer 16 for further analysis.

Caster and SAI for each wheel are calculated by computer 16 from the change in the two camber inclination angle readings for that wheel measured at the left and right turn positions.

Prior to calculating caster and SAI angles, measurements must be taken from both the left and the right front wheels 10L, 10R of toe, camber and inclination angles at both the left turn position and the right turn position.

When the technician selects (through keyboard 18) a caster and SAI measurement procedure, computer 16 guides the technician through the procedure with prompts and graphs displayed on display 20. In particular, as the technician moves the wheels 10L, 10R, computer 16 monitors the toe readings received from the head units 12L and 12R and guides the technician (through display 20) in moving the wheels to the proper left turn position or right turn position.

As illustrated in FIG. 1A, left wheel 10L and right wheel 10R are first turned to the left until left wheel 10L is positioned at the left toe-out angle of approximately X. This defines the "left turn position" for both wheels even though they are not at equal toe angles. The value of X is selected by the designer of the wheel alignment system based on the accuracy of the individual measurement devices and the required accuracy of the caster and SAI measurements. In one embodiment, wheels 10L and 10R are positioned at the left turn position so that the left toe-out angle has a precision of $X = 5° \pm 0.5°$. Choosing a larger value of X further reduces the precision required in positioning wheels 10L and 10R. The value of X, however, may be chosen to be as small as zero degrees.

With wheels 10L and 10R turned to the left turn position of X°, measurements are taken to produce left and right toe angle values (LT1 and RT1), left and right camber angle values (LC1 and RC1), and left and right inclination angle values (LS1 and RS1).

Wheels 10L and 10R are next turned to the right as shown in FIG. 1B such that wheel 10R is positioned at a right toe-out angle of approximately Y°. Y may be made equal to X, although this is not required. In the described embodiment, $Y = 5° \pm 0.5°$. The value of Y is selected by the designer of the wheel alignment system based on the accuracy of the individual measurement devices and the required accuracy of the caster and SAI measurements. Y may even be chosen to be zero degrees. However, X and Y cannot both be zero In the right turn position, additional measurements are made to produce left and right toe angle values (LT2 and RT2), left and right camber angle values (LC2 and RC2), and left and right inclination angle values (LS2 and RS2).

Using the two sets of measured values produced at the left and right turn positions, the caster and SAI are calculated by computer 16 using an iterative technique or through direct solution of the equations. Using the iterative technique, caster and SAI angles are interrelated such that in order to find one of the angles, knowledge of the other angle is required. The interaction of the two angles, however, is weak and approaches zero as the magnitude of the toe-in values approach the magnitude of the toe-out values. The equations for caster and SAI are interdependent upon one another. Using the toe, camber and inclination angle data collected from the left wheel 10L (LT1, LC1, LS1, LT2, LC2, and LS2) as an example, these equations are:

$$SAI = arctan((\sin LS1 - \sin LS2(\cos LS2 \cos LT2 - \cos LS1 \cos LT1) \tan CASTER)/(\cos LS2 \sin LT2 - \cos LS1 \sin LT1))$$ Equation 3

$$CASTER = arctan((\sin LC1 \sin LC2(\cos LC2 \cos LT2 - \cos LC1 \cos LT1) \tan SAI)/(\cos LC2 \sin LT2 - \cos LC1 \sin LT1))$$ Equation 4

It has been found that these two equations will converge when the result of one is substituted into the other, and that the result of the second is then substituted back into the first, in an iterative process. To begin the process, an initial approximate caster value is calculated by computer 16. Again, using the left wheel 10L as an example:

$$Approximate\ CASTER = arctan((\sin LC1 - \sin LC2)/(\sin LT2 - \sin LT1))$$ Equation 5

The approximate caster calculated from Equation 5 is then substituted into Equation 3 to begin the iterative process. These equations rapidly converge to accurate caster and SAI values. It should be noted that approximate SAI rather than caster could also be used as the initial "seed" for the iterative process.

Figure 3:
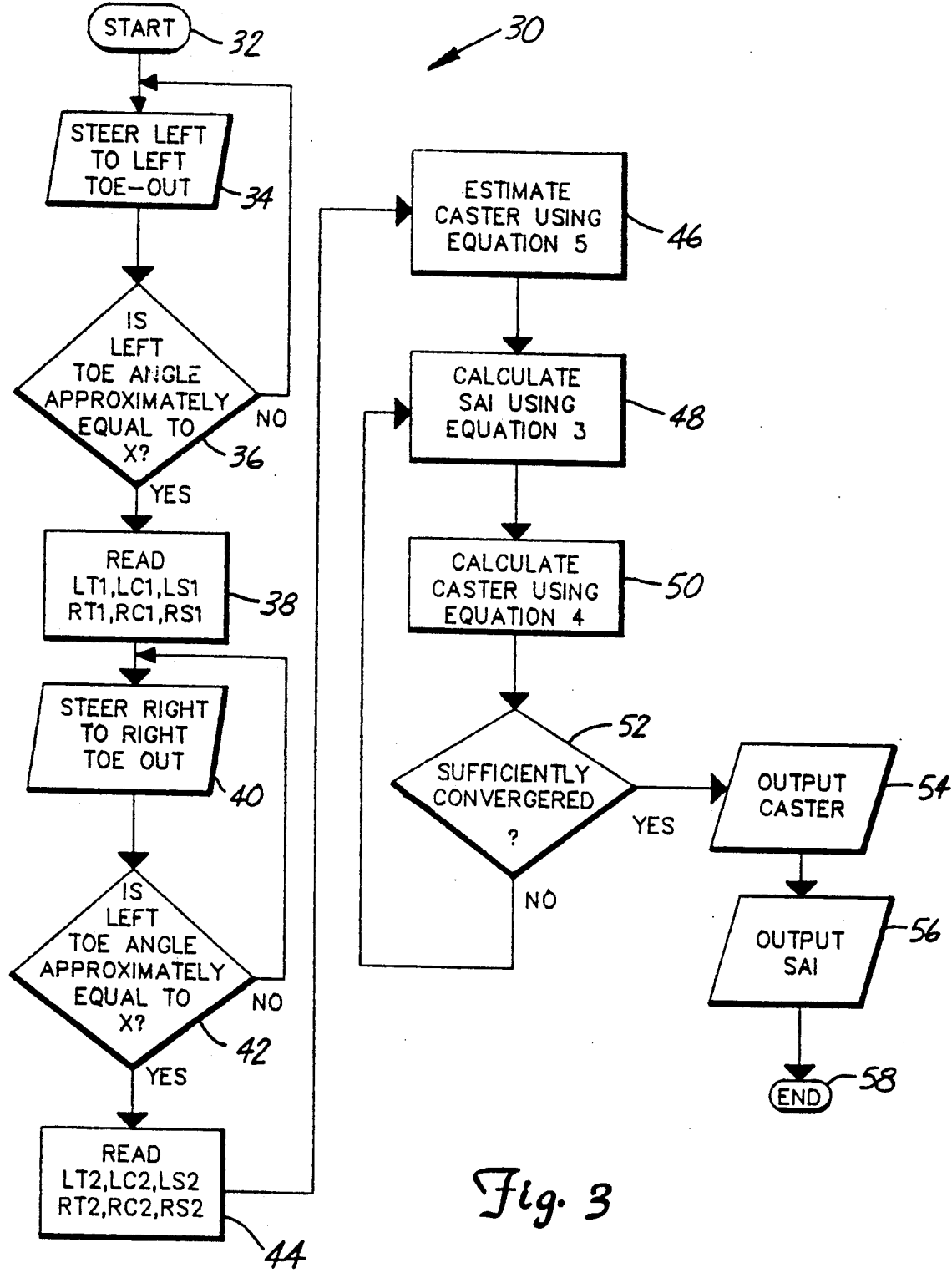
FIG. 3 is a flow chart of the method of the present invention.

Computer 16 calculates caster and SAI for each wheel 10L, 10R using the above-described process. The results of the caster and SAI calculations are then displayed on display 20. An example flow chart 30 showing the steps in the above-described iterative process is shown in FIG. 3. In the example of FIG. 3, the angle Y has been chosen to equal X and is labeled as such in the diagram.

The caster and SAI measurement process is initiated at the cell 32 labeled START in FIG. 3. Next, wheels 10 and 12 are steered to the left to the left turn position (i.e. a left toe-out value of approximately X°) in cell 34. The actual toe angle is then compared with the desired toe angle of X in cell 36 and control is returned to cell 34 if the actual toe angle falls outside a predetermined range of angles about the desired angle X. For example, when X=5°, this range is plus or minus 0.5°.

Data is then collected from both the left and right wheels 10L and 10R for the toe, camber, and inclination angles (LT1, LC1, LS1, RT1, RC1 and RS1) at cell 38.

These steps are next repeated with the wheels 10L and 10R turned approximately to the right turn position (i.e. a right toe-out value of X°) in cell 40. In this example, the right toe-out value has been chosen to equal the left toe-out value, although this is not a requirement of the invention. The actual toe angle is compared in cell 42 with the desired toe angle X and if the actual toe angle falls outside of a predetermined range around a desired toe angle of X°, cell 40 is repeated. For example, when X=5°, an acceptable range of values for the actual total angle is plus and minus 0.5°. Values are again taken from both the left and right wheels 10L and 10R for toe, camber and inclination angle (LT2, LC2, LS2, RT2, RC2 and RS2) at cell 44.

After the data has been collected for wheels 10L and 10R at the left and right turn positions, caster and SAI may be calculated using Equations 3, 4 and 5 in an iterative process. At cell 46, an approximate value of caster is calculated using Equation 5. At cell 48, the approximate value of caster from Equation 5 is used to calculate an initial SAI angle using Equation 3. This result is used in cell 50 to calculate a new value of caster using Equation 4.

If the equations have not sufficiently converged, cell 52 returns control to cell 50. Sufficient convergence of caster or SAI may be determined by comparing the previous value of caster or SAI with its present value. If the change between these two values is less than a predetermined value, the equations are considered sufficiently converged and control is passed by cell 52 to cell 54.

The final values of caster and SAI are then output to the user in cells 54 and 56 and shown on display 20. Control is then passed to cell 58 and the process is complete.

Equations 3 and 4 may be solved through substitution as two equations with two unknowns. This yields direct solutions for caster and SAI. For clarity:

$$A = (\sin LS1 - \sin LS2)/(\cos LS2 \sin LT2 - \cos LS1 \sin LT1)$$

$$B = (\cos LS2 \cos LT2 - \cos LS1 \cos LT1)/(\cos LS2 \sin LT2 \cos LS1 \sin LT1)$$

$$C = (\sin LC1 - \sin LC2)/(\cos LC2 \sin LT2 - \cos LC1 \sin LT2)$$

$$D = (\cos LT1)/(\cos LC2 \sin LT2 - \cos LC1 \sin LT1)$$

The solution for caster and SAI may be expressed directly as:

$$SAI = arctan((A - BC)/(1 - BD))$$ Equation 6

$$CASTER = arctan((C - AD)/(1 - BD))$$ Equation 7

Equations 6 and 7 may be implemented on a computer system in a manner similar to that described above for the iterative equations 3, 4 and 5.

This wheel alignment system decreases the time required to align the wheels of an automotive vehicle. Errors are also reduced because the new alignment system has an increased tolerance. Finally, this system further reduces errors because it uses only two wheel positioning steps, thereby limiting the number of opportunities for the introduction of human errors.

Although the present invention has been described with reference to preferred embodiments, workers skilled in the art will recognize that changes may be made in form and detail without departing from the spirit and scope of the invention.

What is claimed is:

1. A method for accurately measuring caster and steering axis inclination (SAI) of left and right steerable wheels of a vehicle based upon measurements taken with the wheels in less than four different positions, the method comprising:

mounting a left head unit on the left steerable wheel of the vehicle;

mounting a right head unit on the right steerable wheel of the vehicle;

turning the wheels to a first position;

making toe, camber and inclination angle measurements for each of the wheels with the left head unit and the right head unit while the wheels are in the first position;

turning the wheels to a second position;

making toe, camber and inclination angle measurements for each of the wheels while with the left head unit and the right hand unit while the wheels are in the second position; and calculating caster and SAI of each wheel using the toe, camber and inclination angle measurements made for that wheel at the first and second positions.

2. The method of claim 1 wherein making toe, camber and inclination angle measurements while the wheels are in the first position includes producing a first set of left and right toe values (LT1 and RT1), left and right camber values (LC1 and RC1) and left and right inclination angle values (LS1 and RS1); and making toe, camber and inclination angle measurements while the wheels are in the second position includes producing a second set of left and right toe values (LT2 and RT2), left and right camber values (LC2 and RC2) and left and right inclination angle values (LS2 and RS2).

3. The method of claim 2 wherein calculating caster and SAI for the left wheel is by an iterative technique using the following formulae:

$$SAI = arctan((\sin LS1 - \sin LS2 - (\cos LS2 \cos LT2 - \cos LS1 \cos LT1) \tan CASTER)/(\cos LS2 \sin LT2 - \cos LS1 \sin LT1))$$

$$CASTER = arctan((\sin LC1 - \sin LC2 - (\cos LC2 \cos LT2 - \cos LC1 \cos LT1) \tan SAI)/(\cos LC2 \sin LT2 - \cos LC1 \sin LT1))$$

4. The method of claim 3 wherein the iterative technique is initiated with an initial approximate caster.

5. The method of claim 4 and further comprising: calculating initial approximate caster value (Approximate CASTER) by the following formula:

$$Approximate\ CASTER = arctan((\sin LC1 - \sin LC2)/(\sin LT2 - \sin LT1))$$

6. The method of claim 2 wherein calculating caster and SAI for the right wheel is by an iterative technique using the following formulae:

$$SAI = arctan((\sin RS1 - \sin RS2 - (\cos RS2 \cos RT2 - \cos RS1 \cos RT1) \tan CASTER)/(\cos RS2 \sin RT2 - \cos RS1 \sin RT1))$$

$$CASTER = arctan((\sin RC1 - \sin RC2 - (\cos RC2 \cos RT2 - \cos RC1 \cos RT1) \tan SAI)/(\cos RC2 \sin RT2 - \cos RC1 \sin RT1))$$

7. The method of claim wherein the step of calculating the caster and SAI is an iterative process.

8. The method of claim 1 wherein the first position is defined by a left toe-out angle of the left wheel, and the second position is defined by a right toe-out angle of the right wheel.

9. The method of claim 3 wherein the iterative technique is initiated with an initial approximate SAI.

10. The method of claim 2 wherein calculating caster and SAI for the left wheel is by a direct technique using the following formulae:

$$SAI = arctan((A - BC)/(1 - BD))$$

$$CASTER = arctan((C - AD)/(1 - BD))$$

where A, B, C and D are defined as:

$$A = (\sin LS1 - \sin LS2)/(\cos LS2 \sin LT2 - \cos LS1 \sin LT1)$$

$$B = (\cos LS2 \cos LT2 - \cos LS1 \cos LT1)/(\cos LS2 \sin LT2 - \cos LS1 \sin LT1)$$

$$C = (\sin LC1 - \sin LC2)/(\cos LC2 \sin LT2 - \cos LC1 \sin LT1)$$

$$D = (\cos LC2 \cos LT2 - \cos LC1 \cos LT1)/(\cos LC2 \sin LT2 - \cos LC1 \sin LT1)$$

11. The method of claim 2 wherein calculating caster and SAI for the right wheel is by a direct technique using the following formulae:

$$SAI = arctan((A - BC)/(1 - BD))$$

$$CASTER = arctan((C - AD)/(1 - BD))$$

where A, B, C and D are defined as:

$$A = (\sin RS1 - \sin RS2)/(\cos RS2 \sin RT2 - \cos RS1 \sin RT1)$$

$$B = (\cos RS2 \cos RT2 - \cos RS1 \cos RT1)/(\cos RS2 \sin RT2 - \cos RS1 \sin RT1)$$

$$C = (\sin RC1 - \sin RC2)/(\cos RC2 \sin RT2 - \cos RC1 \sin RT1)$$

$$D = (\cos RC2 \cos RT2 - \cos RC1 \cos RT1)/(\cos RC2 \sin RT2 - \cos RC1 \sin RT1)$$

12. An apparatus for measuring caster of left and right steerable wheels of a vehicle based upon measurements taken with the wheels in less than four different positions, the apparatus comprising:

a left head unit for mounting to a left steerable wheel of a vehicle, the left head unit including:

means for measuring left toe angles of the left wheel;

means for measuring left camber angles of the left wheel;

means for measuring left inclination angles of the left wheel;

a right head unit for mounting to the right steerable wheel of a vehicle including the right head unit including:

means for measuring right toe angles of the right wheel;

means for measuring right camber angles of the right wheel;

means for measuring right inclination angles of the right wheel;

means connected to the left and right head units for collecting a first set of measurements from the means for measuring left toe angles and the means for measuring right toe angles, the means for measuring left camber angles and the means for measuring right camber angles, and the means for measuring left inclination angles and the means for measuring right inclination angles when the left and right wheels are steered to a first position;

means connected to the left and right head units for collecting a second set of measurements from the means for measuring left toe angles and the means for measuring right toe angles, the means for measuring left camber angles and the means for measuring right camber angels, and the means for measuring left inclination angles and the means for measuring right inclination angles when the left and right wheels are steered to a second positions; and means connected to the left and right head units for providing outputs representative of the caster of the left and right wheels as a function of the first and second sets of measurements.

13. The apparatus of claim 12 wherein the means for providing outputs includes:

means for calculating caster and SAI values for each wheel based upon an iterative process using the first and second sets of measurements; and means for providing the output based upon the calculated caster and SAI values.

14. The apparatus of claim 13 wherein the first set of measurements include left and right toe values (LT1 and RT1), left and right camber values (LC1 and RC1) and left and right inclination angle values (LS1 and RS1), and wherein the second set of measurements include left and right toe values (LT2 and RT2), left and right camber values (LC2 and RC2), and left and right inclination angle values (LS2 and RS2).

15. The apparatus of claim 14 wherein the means for calculating calculates caster and SAI for the left wheel according to the following formulae:

$SAI = arctan((sin\ LS1 - sin\ LS2 - (cos\ LS2\ cos\ LT2 - cos\ LS1\ cos\ LT1)\ tan\ CASTER)/(cos\ LS2\ sin\ LT2 - cos\ LS1\ sin\ LT1))$ $CASTER = arctan((sin\ LC1 - sin\ LC2 - (cos\ LC2\ cos\ LT2 - cos\ LC1\ cos\ LT1)\ tan\ SAI)/(cos\ LC2\ sin\ LT2 - cos\ LC1\ sin\ LT1))$ and calculates caster and SAI for the right wheel according to the following formulae:

$SAI = arctan((sin\ RS1 - sin\ RS2 - (cos\ RS2\ cos\ RT2 - cos\ RS1\ cos\ RT1)\ tan\ CASTER)/(cos\ RS2\ sin\ RT2 - cos\ RS1\ sin\ RT1))$ $CASTER = arctan((sin\ RC1 - sin\ RC2 - (cos\ RC2\ cos\ RT2 - cos\ RC1\ cos\ RT1)\ tan\ SAI)/(cos\ RC2\ sin\ RT2 - cos\ RC1\ sin\ RT1))$ 16. The apparatus of claim 15 wherein the means for calculating uses an initial approximate caster value for each wheel in calculating caster and SAI values.

17. The apparatus of claim 16 wherein the means for calculating calculates the initial approximate caster values by the following formulae:

$Approximate\ left\ CASTER = arctan((sin\ LC1 - sin\ LC2)/(sin\ LT2 - sin\ LT1))$ $Approximate\ right\ CASTER = arctan((sin\ RC1 - sin\ RC2)/(sin\ RT2 - sin\ RT1))$ 18. The apparatus of claim 14 wherein the means for calculating calculates caster and SAI for the left wheel according to the following formulae:

$SAI = arctan((A - BC)/(1 - BD))$ $CASTER = arctan((C - AD)/(1 - BD))$ where A, B, C and D are defined as:

$A = (sin\ LS1 - sin\ LS2)/(cos\ LS2\ sin\ LT2 - cos\ LS1\ sin\ LT1)$ $B = (cos\ LS2\ cos\ LT2 - cos\ LS1\ cos\ LT1)/(cos\ LS2\ sin\ LT2 - cos\ LS1\ sin\ LT1)$ $C = (sin\ LC1 - sin\ LC2)/(cos\ LC2\ sin\ LT2 - cos\ LC1\ sin\ LT1)$ $D = (cos\ LC2\ cos\ LT2 - cos\ LC1\ cos\ LT1)/(cos\ LC2\ sin\ LT2 - cos\ LC1\ sin\ LT1)$ and calculates camber and SAI for the right wheel according to the following formulae:

$SAI = arctan((A - BC)/(1 - BD))$ $CASTER = arctan((C - AD)/(1 - BD))$ where A, B, C and D are defined as:

$A = (sin\ RS1 - sin\ RS2)/(cos\ RS2\ sin\ RT2 - cos\ RS1\ sin\ RT1)$ $B = (cos\ RS2\ cos\ RT2 - cos\ RS1\ cos\ RT1)/(cos\ RS2\ sin\ RT2 - cos\ RS1\ sin\ RT1)$ $C = (sin\ RC1 - sin\ RC2)/(cos\ RC2\ sin\ RT2 - cos\ RC1\ sin\ RT1)$ $D = (cos\ RC2\ cos\ RT2 - cos\ RC1\ cos\ RT1)/(cos\ RC2\ sin\ RT2 - cos\ RC1\ sin\ RT1)$ 19. The apparatus of claim 15 wherein the means for calculating uses an initial approximate SAI value for each wheel in calculating caster and SAI values.

20. A method for accurately measuring caster of left and right steerable wheels of a vehicle, the method comprising:

mounting measurement devices on the left and right steerable wheels;

turning the wheels to a first left turn position in which the left steerable wheel is toed-out;

making toe, camber and inclination angle measurements for each of the wheels using the measurement devices while the wheels are in the first position;

turning the wheels to a second right turn position in which the right steerable wheel is toed-out;

making toe, camber and inclination angle measurements for each of the wheels using the measurement devices while the wheels are in the second;

calculating caster of each wheel using only two sets of measurements, which comprise the toe, camber and inclination angle measurements made for that wheel at the first and second positions; and providing outputs representative of the caster calculated for each wheel.

21. The method of claim 20 wherein making toe and camber measurements while the wheels are in the first position includes producing a first set of left and right toe values (LT1 and RT1), left and right camber values (LC1 and RC1), and left and right inclination angle values (LS1 and RS1); and making toe and camber measurements while the wheels are in the second position includes producing a second set of left and right toe values (LT2 and RT2), left and right camber values (LC2 and RC2), and left and right inclination angle values (LS2 and RS2).

22. An apparatus for measuring caster of left and right steerable wheels of a vehicle, the apparatus comprising:

means for measuring toe angles of the left and right wheels;

means for measuring camber angle of the left and right wheels;

means for measuring inclination angle of the left and right wheels;

means for prompting user to steer the wheels to a first position and then to a second position;

means for collecting and storing a first set of measurements from the means for measuring toe angles, the means for measuring camber angles and the means for measuring inclination angle when the left and right wheels are steered to the first position;

means for collecting and storing a second set of measurements from the means for measuring toe angles, the means for measuring camber angles and the means for measuring inclination angle when the left and right wheels are steered to the second position;

means for calculating caster and SAI values for each wheel based solely upon the stored first and second sets of measurements; and means for providing outputs representative of the caster of the left and right wheels based upon the calculated caster and SAI values.

23. The apparatus of claim 22 wherein the first set of measurements include left and right toe values (LT1 and RT1), left and right camber values (LC1 and RC1), and left and right inclination angle values (LS1 and RS1), and wherein the second set of measurements include left and right toe values (LC2 and RT2), left and right camber values (LC2 and RC2), and left and right inclination angle values (LS2 and RS2).

* * * * *

UNITED STATES PATENT AND TRADEMARK OFFICE
CERTIFICATE OF CORRECTION

PATENT NO. : 5,014,227
DATED : May 7, 1991
INVENTOR(S) : Michael J. Kling et al.

It is certified that error appears in the above-identified patent and that said Letters Patent is hereby corrected as shown below:

Col. 7, line 55, delete "claim", insert --claim 1--.

Col. 9, line 11, delete "angels", insert --angles--.

Col. 9, line 14, delete "positions", insert --position--.

Col. 11, line 3, after "second", insert --position--.

Signed and Sealed this

Eighth Day of December, 1992

Attest:

DOUGLAS B. COMER

Attesting Officer

Acting Commissioner of Patents and Trademarks